United States Patent [19]
Ratliff, Jr.

[11] 3,728,048
[45] Apr. 17, 1973

[54] VARIABLE DISPLACEMENT MOTORS
[76] Inventor: George D. Ratliff, Jr., 2314 Forest Drive, Pittsburgh, Pa. 15235
[22] Filed: May 19, 1971
[21] Appl. No.: 144,845

[52] U.S. Cl. .........................418/17, 418/26, 418/27, 418/257
[51] Int. Cl. ............................F01c 1/00, F01c 21/16
[58] Field of Search......................418/16, 17, 24, 25, 418/26, 27, 257

[56] References Cited

UNITED STATES PATENTS 2,606,503  8/1952  Shaw .................................... 418/16
2,685,842  8/1954  Hufferd ................................ 418/26
3,200,756  8/1965  Ratliff, Jr. ............................ 418/27

Primary Examiner—Allan D. Herrmann

[57] ABSTRACT

A vane-type motor uses the centrifugal force of the vanes to drag the control ring and control displacement. Reaction torque on the control ring is cancelled by a secondary vane mounted on the control ring and operating in a tapered chamber. The result is a hydrostatic motor which automatically and gradually shifts displacement in response to speed changes but will not respond to pressure changes.

3 Claims, 1 Drawing Figure

PATENTED APR 17 1973 3,728,048
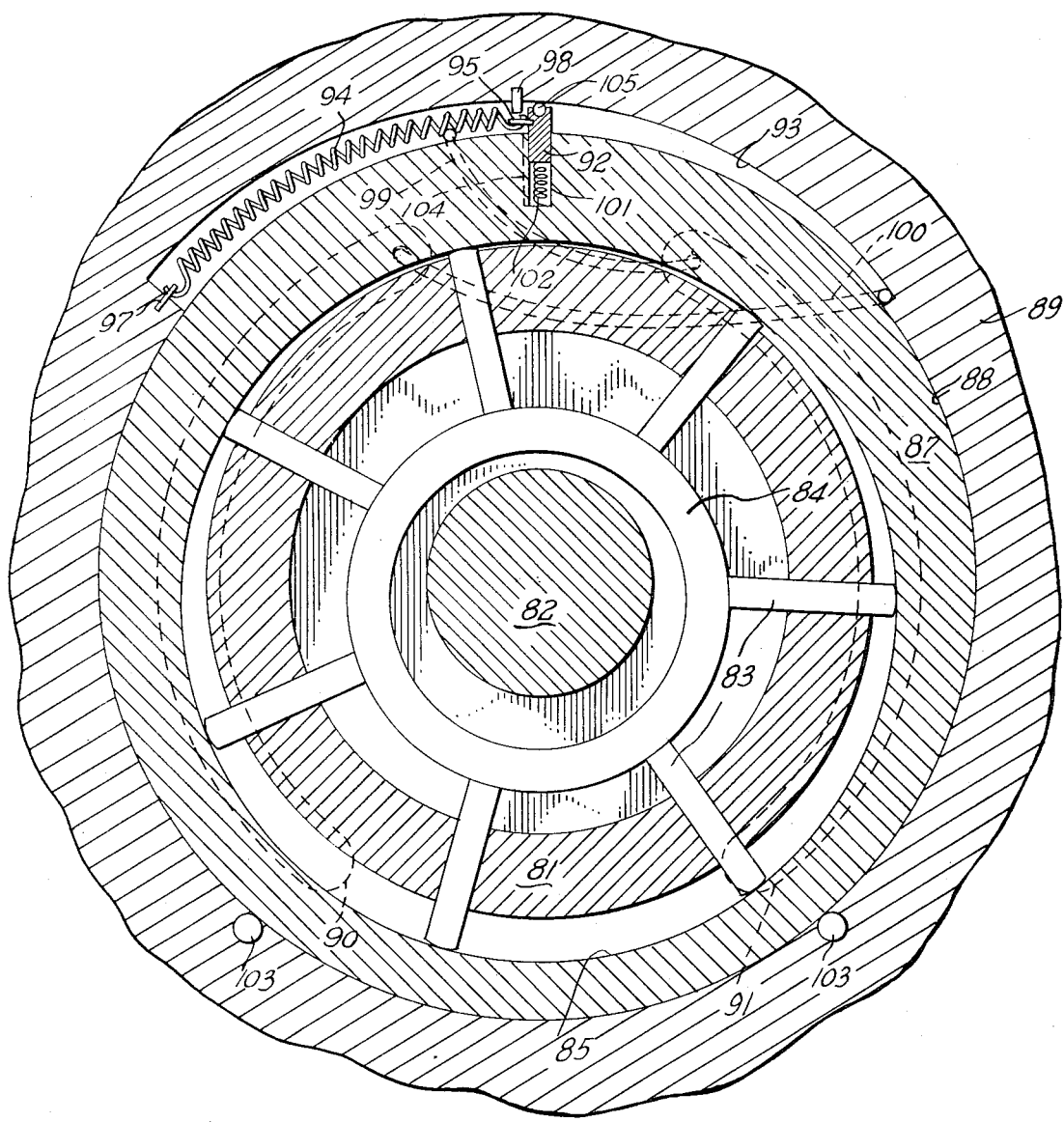
George D. Ratliff, Jr.
INVENTOR.

VARIABLE DISPLACEMENT MOTORS

This invention relates to improvements in vane-type hydrostatic motors and more particularly concerns an automatic control for motors of this type. Such motors may be used in the wheels of vehicles.

Most motors of this type respond to pressure in the motor although it is well known that automobiles need a transmission which will respond to speed changes. An important object of the present invention is to obtain an automatic transmission in the motor which automatically responds to wheel speed.

Another object is to provide an automatic compensator for the hydrostatic reaction-torque in vane-type motors.

Other objects, features, and advantages of the present invention will be readily apparent from the following detailed description of certain preferred embodiments thereof taken in conjunction with the accompanying drawing.

The drawing is a fragmentary sectional detail view through a variable displacement motor embodying the principles of the invention.

The motor embodying the control according to the present invention comprises a rotor 81, fixed concentrically on a drive shaft 82, and radially slotted to accommodate a series of radially reciprocative impeller vanes 83. The rotor 81 and the vanes 83 are of well known type wherein the inner ends of the vanes ride against free floating guide rings 84 within circular clearance pockets or cavities in the opposite sides of the rotor 81, the ring and cavity at only one side of the rotor being shown in FIG. 1. The outer ends of the vanes have slidable bearing engagement with an inner circular motor chamber bearing surface 85 disposed eccentrically to the rotor 81 on an encircling modulator ring 87 and which is rotatably slidably supported by a bearing surface 88 afforded by a housing or casing 89. Rotation friction of the ring 87 may be reduced by ball or roller bearings 103 in the housing. An inlet port 91 and an outlet port 90 both in housing 89 communicate with the eccentric motor chamber afforded between the rotor and modulator ring. Motor displacement is controlled by rotary movement of the modulator ring 87 so that a maximum displacement with respect to the outlet port 90 is attained in substantially the counter-clockwise relative relationship of the modulator ring 87 as shown in FIG. 1, while minimum displacement is in effect when the modulator ring is turned clockwise as viewed in FIG. 1. In the present instance the limits upon rotary movements of the modulator 87 are defined by a radial vane member 92 which projects from the periphery of the modulator ring into a tapered chamber 93 in the surrounding housing 89. The vane 92 is stopped at one end of its travel by lug 98 and the opposite end of its travel by the narrow end of chamber 93.

In the present instance, the vane 92 serves also as a part of a fluid motor servo-control system for automatically compensating the modulator ring 87 for hydrostatic reaction torque acting on the modulator ring 87 at chamber surface 85. To this end, the vane 92 makes relatively close bearing, substantially fluid sealing slidable contact with the walls defining the tapered chamber surface 93. The slidable contact may be equipped with a friction reducing roller bearing 105. Means for biasing the vane 92 into the maximum displacement position of the modulator 87 comprises a coiled, helical tension spring 94 which has one end engaged about a pin 95 projecting from the surface of the vane 92 while the opposite end of the spring is engaged about a stationary pin or boss 97 which projects from the engaged end wall defining the tapered chamber 93. Pressure equalization is maintained between high and low pressure parts of chamber 93 and the high and low pressure ports of the main operating chamber 85. To this end, a pressure duct 99 leads from the high pressure side of the motor at the inlet port 91 to the high pressure portion of chamber 93; and duct 100 connects the low pressure inlet 90 with the low pressure portion of chamber 93.

Since the hydrostatic reaction torque acting on the surface 85 of the modulator ring varies with the varying eccentricity of the surface 85 with respect to the shaft 82, the compensating vane 92 also changes active pressure area with the varying eccentricity of the modulator 87. To this end, the vane 92 is retractable into slot 101 and chamber 93 is tapered. Means for biasing the vane 92 outward against chamber 93 comprises a coiled, helical, compression spring 102. A groove 104 in the wall of slot 101 prevents entrapment of fluid in the slot as the vane 92 retracts.

When the torque applied by hydrostatic pressure acting on the compensating vane 92 balances the reaction torque acting on the inside surface of the modulator chamber 85 then the compensating torque applied by vane 92 cancels the reaction torque acting on the inside surface of the modulator chamber 85.

In order for the above mentioned torques to balance, the product of the eccentricity and area of the vane 92 which extends into the chamber 93 must equal the product of the eccentricity and the transversely projected area of chamber 85. Said equality must be maintained at all positions of the modulator ring 87, and to this end the radial thickness of chamber 93 decreases or tapers towards the bounding surface of the modulator ring 87 in order that the area and to a lesser extent the eccentricity of the vane 92 projecting into chamber 93 will be reduced when the eccentricity of the motor chamber 85 is reduced. The modulator ring 87 will then be unaffected by pressure changes in the ports 90 and 91. Therefore the modulator ring 87 will be responsive solely to changes in centrifugal drag of the vanes 83 and the biasing spring 94. It is well known that centrifugal drag is determined by the rotation speed; therefore, the motor is responsive solely to rotation speed and a predetermined spring bias.

The function of the speed responsive modulator ring 87 is to maintain the fluid motor at a predetermined relationship between shaft output power and working fluid pressure by increasing or decreasing the volume of working fluid. For many applications said predetermined relationship will approximate a constant.

It will, of course, be understood that various details of the disclosure may be varied without departing from the principles of the invention. For example, vane type motors wherein the inner ends of the rotor vanes are biased outwards radially by springs, such as is shown in U.S. Pat. No. 3,200,756, may also employ the principle of this invention. It is, therefore, not the purpose to limit the patent granted hereon otherwise than necessitated by the scope of the appended claims.

What I claim is:

1. A vane-type rotary motor having a rotatable modulator ring, a rotor with radially reciprocative vanes, a tapered hydrostatic chamber for controlling the rotation of the modulator ring, a vane attached to the modulator ring with means for maintaining close fit to the tapered chamber, a duct from the narrow end of the tapered chamber to the low-pressure port of the main motor chamber, a duct from the broad end of the tapered chamber connected to the high-pressure port of the main motor chamber and biasing means for rotating the modulator ring towards the broad end of the tapered chamber.

2. A motor as described in claim 1, wherein said means for maintaining a close fit comprises said vane in a slot with biasing means.

3. A motor as described in claim 1, wherein at any position of the modulator ring the product of the projecting area of said modulator ring vane, and the eccentricity of said projecting area equals the product of the cross-sectional area and eccentricity of said rotor chamber.